(12) United States Patent
Tsujii et al.

(10) Patent No.: US 7,084,620 B2
(45) Date of Patent: Aug. 1, 2006

(54) MAGNETIC DETECTION APPARATUS (75) Inventors: Shigeki Tsujii, Tokyo (JP); Takuji Nada, Tokyo (JP); Naoki Hiraoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 223 days.

(21) Appl. No.: 10/418,099

(22) Filed: Apr. 18, 2003

(65) Prior Publication Data

US 2004/0080314 A1    Apr. 29, 2004

(30) Foreign Application Priority Data

Oct. 24, 2002   (JP)   ............... 2002-309566

(51) Int. Cl.
*G01B 7/14* (2006.01)
*G01B 7/30* (2006.01)
*G01R 33/06* (2006.01)
*H01L 43/06* (2006.01)

(52) U.S. Cl. ................. 324/207.2; 324/207.21
(58) Field of Classification Search ............. 324/207.2, 324/207.21, 251, 174, 207.25, 207.24, 166, 324/178, 179, 180
See application file for complete search history.

(56) References Cited

U.S. PATENT DOCUMENTS

| | | | | |
|---|---|---|---|---|
| 5,010,263 A | * | 4/1991 | Murata | ................ 310/68 B |
| 5,014,005 A | * | 5/1991 | Murata et al. | ........... 324/207.2 |
| 5,107,388 A | * | 4/1992 | Murata et al. | ............... 361/56 |
| 5,134,371 A | * | 7/1992 | Watanabe et al. | ........... 324/252 |
| 5,488,294 A | * | 1/1996 | Liddell et al. | .......... 324/207.21 |
| 5,637,995 A | * | 6/1997 | Izawa et al. | ................ 324/174 |
| 6,157,186 A | * | 12/2000 | Aoki et al. | ................ 324/174 |
| 6,265,865 B1 | * | 7/2001 | Engel et al. | ............. 324/207.2 |
| 6,326,779 B1 | * | 12/2001 | Shinjo et al. | ........... 324/207.21 |

FOREIGN PATENT DOCUMENTS

| | | |
|---|---|---|
| DE | 197 44 673 A1 | 5/1999 |
| JP | 7-260813 A | 10/1995 |
| JP | 11-304894 A | 11/1999 |
| JP | 2002-214311 A | 7/2002 |
| JP | 2002-257840 A | 9/2002 |
| KR | 1999-007336 A | 1/1999 |

OTHER PUBLICATIONS

German Office Action.
Korean Intellectual Property Office, Notice of Ground for Rejection.
Japanese Office Action dated Nov. 19, 2004.

* cited by examiner

*Primary Examiner*—Bot Ledynh
*Assistant Examiner*—Kenneth J. Whittington
(74) *Attorney, Agent, or Firm*—Sughrue Mion, PLLC (57) ABSTRACT

A magnetic detection apparatus includes a first block, a second block, and an exterior resin covering the first block and the second block. The first block includes a magnetoresistive element for detecting a change in a magnetic field that varies in accordance with movement of a rotating member, electronic components forming a protection circuit against external noise, a first lead frame electrically connected with the electronic components, and a first base in which the electronic components, the first lead frame and the magnetoresistive element are sealed with a resin. The second block includes a magnet arranged in opposition to an object to be detected for generating a magnetic field, a second lead frame electrically connected with the first lead frame and having a connector terminal for outputting an output signal of the magnetoresistive element to an external member, and a second base in which the second lead frame is sealed with a resin.

15 Claims, 8 Drawing Sheets

MAGNETIC DETECTION APPARATUS

BACKGROUND OF THE INVENTION

1. Field of the Invention

The present invention relates to a magnetic detection apparatus for detecting a change in the magnetic field by a magnetic detection part thereby to detect the number of revolutions per minute of an object to be detected for instance.

2. Description of the Related Art

There has hitherto been known a magnetic detection apparatus in which electronic components for forming a circuit to remove external noise are arranged on a base that is formed by insert-molding a magnet and a lead frame, which together serve as a magnetic field generation part, with a resin, with a magnetic detection part being arranged on the base at a location near the magnet for detecting a change in the magnetic field (for instance, see a first patent document: Japanese patent application laid-open No. 19-105757, paragraph Nos. 0004 and 0005 as well as FIG. 3).

In the above-mentioned known magnetic detection apparatus, the magnetic detection part and the electronic components are arranged and exposed individually or separately from one another. Therefore, in order to prevent damage to the magnetic detection part and electronic components at their connection portions for instance, it is necessary to handle these part and components with extreme care until the base having these part and components mounted thereon is assembled or built into a casing. This results in a problem of inhibiting improvements in productivity.

SUMMARY OF THE INVENTION

Accordingly, the present invention is intended to solve the above-mentioned problem, and has for its object to provide a magnetic detection apparatus which is improved in productivity.

Bearing the above object in mind, the present invention resides in a magnetic detection apparatus including a first block, a second block, and an exterior resin covering the first block and the second block. The first block includes a magnetic detection part for detecting a change in a magnetic field that varies in accordance with movement of an object to be detected, an electronic component for controlling a signal from the magnetic detection part, a first lead frame electrically connected with the electronic component, a first base in which the electronic component, the first lead frame and the magnetic detection part are sealed with a resin. The second block includes a magnetic field generation part arranged in opposition to the object to be detected for generating a magnetic field, a second lead frame electrically connected with the first lead frame and having a connector terminal for outputting an output signal of the magnetic detection part to an external member, and a second base in which the second lead frame is sealed with a resin.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

FIG. 1 through FIG. 13 are constructional views illustrating a magnetic detection apparatus according to a first embodiment of the present invention.

Figure 1:
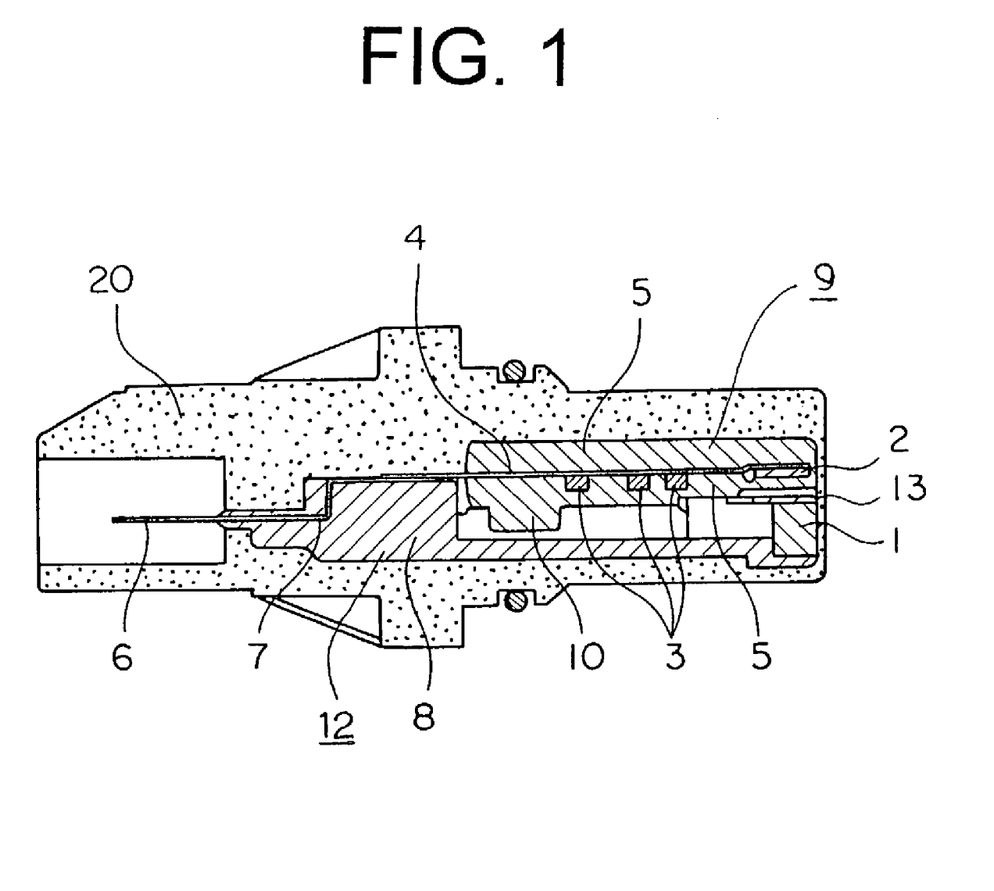
FIG. 1 is a cross sectional front view of a magnetic detection apparatus according to a first embodiment of the present invention.

The magnetic detection apparatus of this embodiment includes a magnetic field generation part in the form of a magnet 1 arranged in opposition to an object to be detected (not shown) for generating a magnetic field, a magnetic detection part in the form of a magnetoresistive element 2 for detecting a change in the magnetic field that varies in accordance with the rotation of the object to be detected, electronic parts or components 3 forming a protection circuit against external noise, a first lead frame 4 electrically connected through welding with the electronic components 3, and a first base 5 in which the electronic components 3, the first lead frame 4 and the magnetoresistive element 2 are sealed with a resin by insert molding.

Here, note that the magnetoresistive element 2, the electronic components 3, the first lead frame 4 and the first base 5 together constitute a first block 9.

Figure 2:
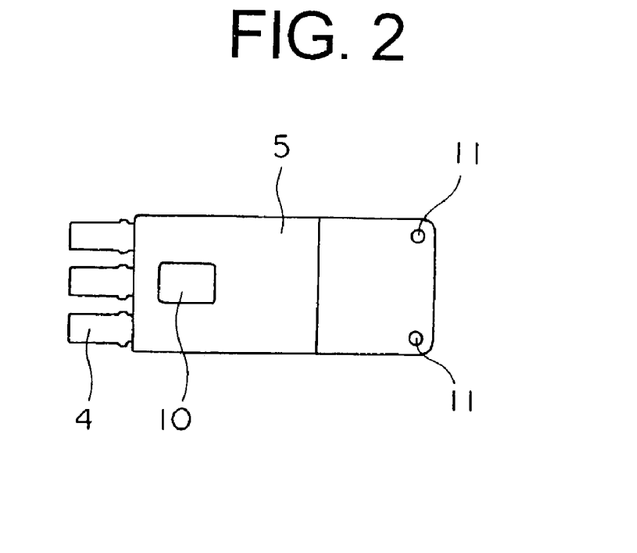
FIG. 2 is a bottom plan view of a first block shown in FIG. 1.
Figure 3:
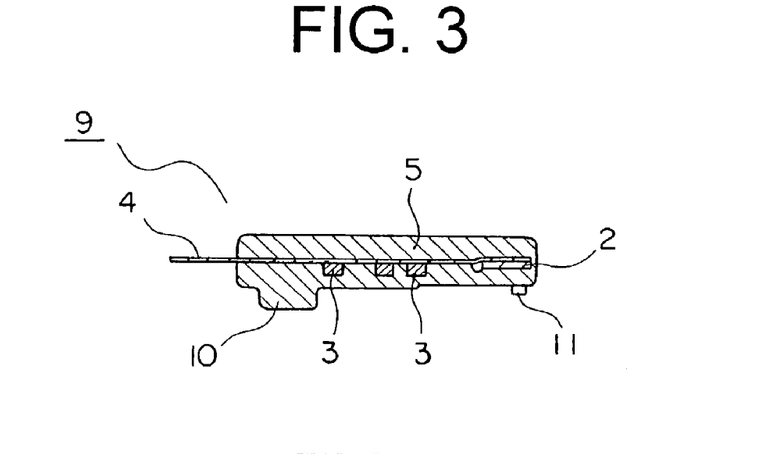
FIG. 3 is a cross sectional view of the first block shown in FIG. 2.
Figure 4:
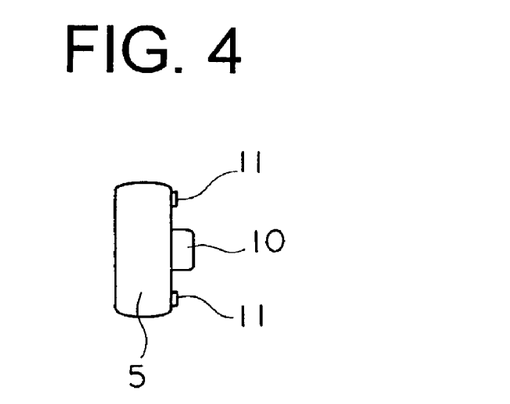
FIG. 4 is a left side view of the first block shown in FIG. 2.

FIG. 2 through FIG. 4 are views showing the first block 9. In addition, the insert molding as used in the present invention is a method of molding the first base 5 with the resin in which the electronic components 3 and the first lead frame 4 are arranged when the resin is set or hardened.

A protruding press-fit portion 10 is formed on a lower surface of the first base 5. Also, the first base 5 is formed on its lower surface with a pair of protrusions 11 which protrude in the same direction in which the press-fit portion 10 protrudes.

Moreover, the magnetic detection apparatus includes a second lead frame 7 electrically connected through welding with the first lead frame 4 and having a connector terminal 6 for outputting an output signal of the magnetoresistive element 2 to an external member, and a second base 8 sealing the second lead frame 7 with a resin by means of insert molding and formed integrally with the first base 5.

Figure 5:
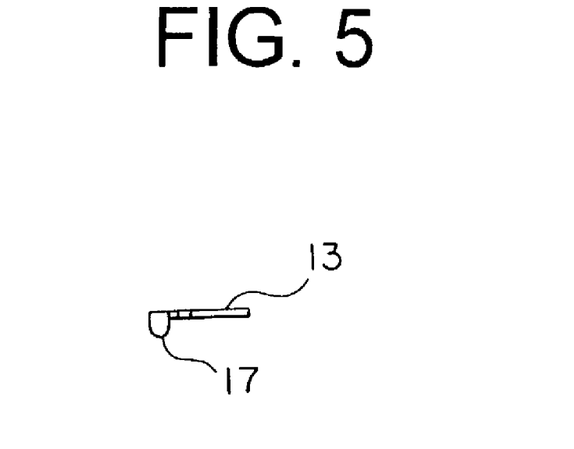
FIG. 5 is a front elevational view of a guide shown in FIG. 1.
Figure 6:
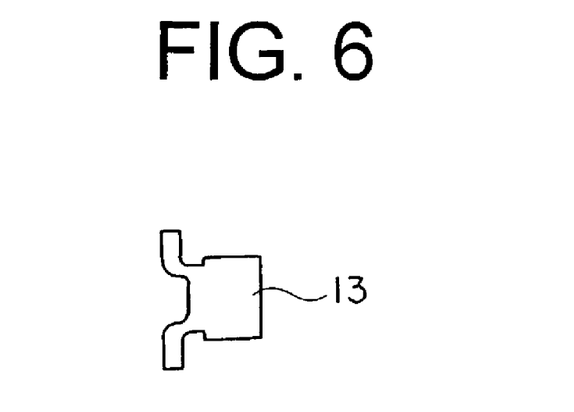
FIG. 6 is a plan view of the guide shown in FIG. 5.
Figure 7:
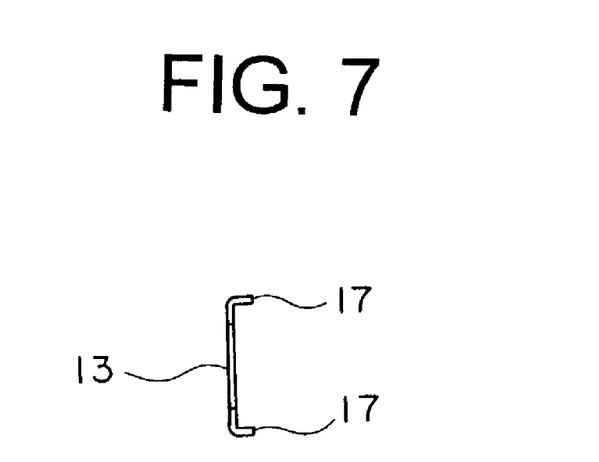
FIG. 7 is a right side view of the guide shown in FIG. 5.

As shown in FIG. 5 through FIG. 7, the magnet 1 and a guide 13 for guiding the magnetic field generated by the magnet 1 to the magnetoresistive element 2 are press-fitted into an anti-connector-terminal side portion of the second base 8, i.e., a side or end of the second base 8 remote from the connector terminal 6.

Figure 8:
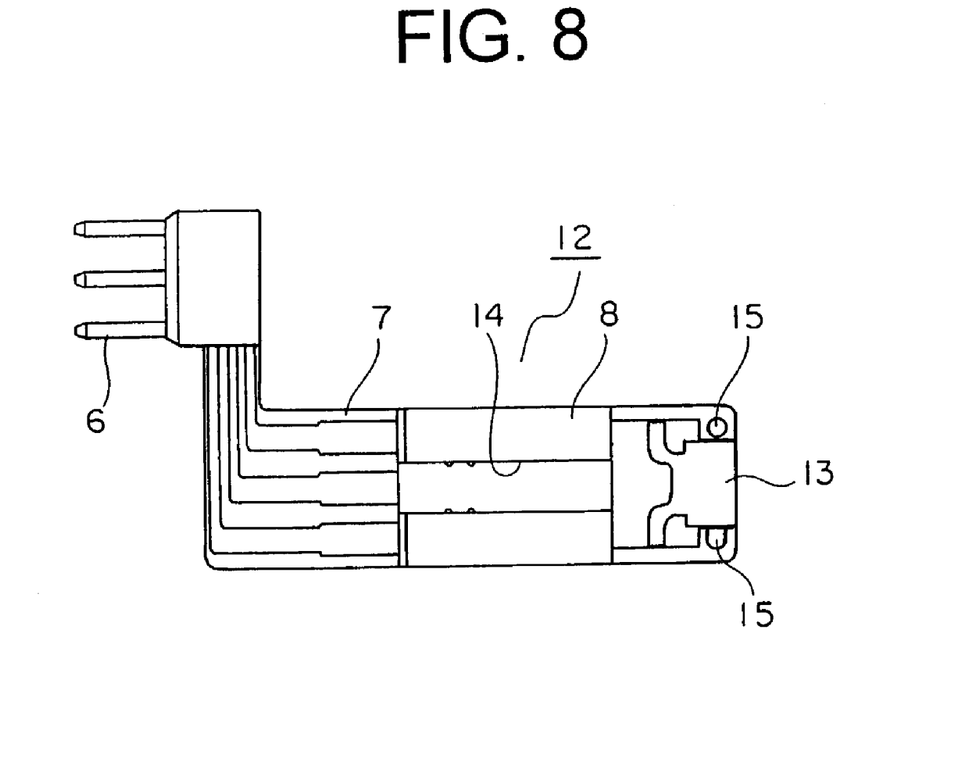
FIG. 8 is a plan view of a second block shown in FIG. 1.
Figure 9:
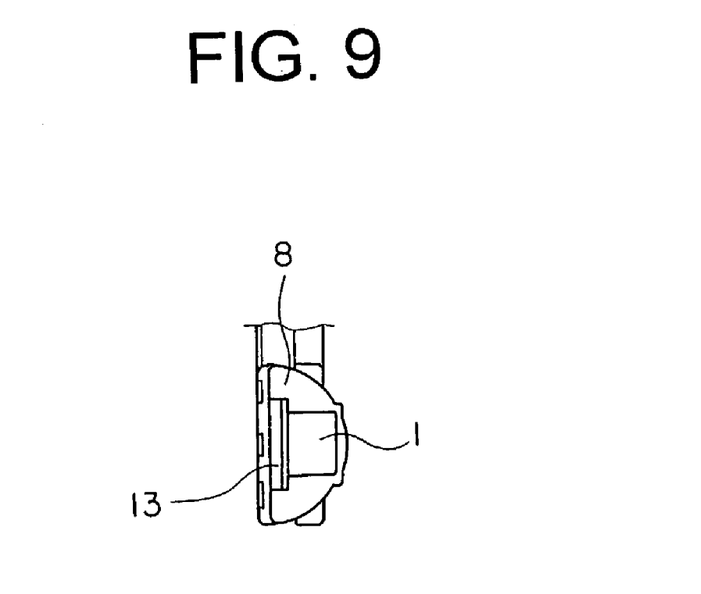
FIG. 9 is a right side view of the second block shown in FIG. 8.

Here, note that the magnet 1, the guide 13, the second lead frame 7 and the second base 8 together constitute a second block 12 (see FIG. 8 and FIG. 9).

Figure 10:
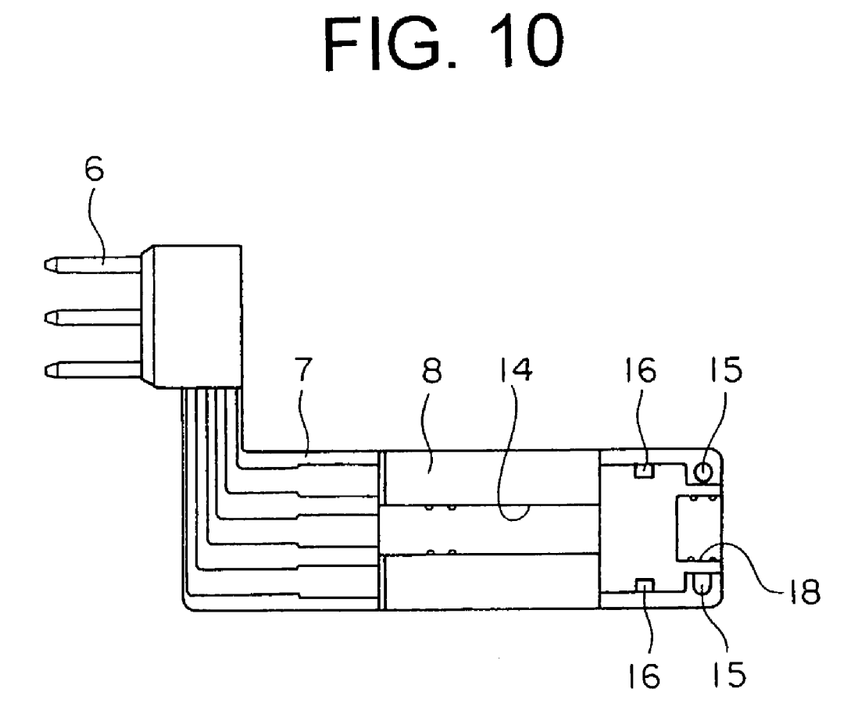
FIG. 10 is a plan view of the second block of FIG. 1 in one state in the course of production.
Figure 11:
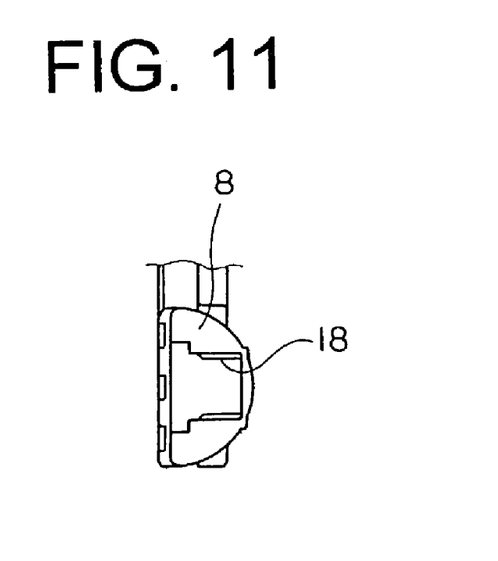
FIG. 11 is a right side view of the second block shown in FIG. 10.

As shown in FIG. 10 and FIG. 11, the second base 8 is formed in an intermediate portion of an upper surface thereof with a groove 14 into which the press-fit portion 10 is press-fitted. Also, the second base 8 is formed on its upper surface with holes 15 into which the protrusions 11 of the first base 5 are press-fitted. In addition, the second base 8 is further formed on its upper surface with holes 16 into which protrusions 17 formed at the opposite ends of the guide 13 are press-fitted. Moreover, the second base 8 is further formed at an anti-connector-terminal side of the upper surface thereof with a hole 18 into which the magnet 1 is press-fitted.

Here, note that the protrusions 11 and the holes 15 together constitute a positioning part that decides the relative position between the first block 9 and the second block 12.

The first block 9 and the second block 12 are resin-sealed with an exterior resin 20 in such a manner that the connector terminal 6 can be exposed therefrom.

In the magnetic detection apparatus as constructed above, concave portions and convex portions of the object to be detected in the form of a magnetic member arranged at a location near the apparatus alternately come into the proximity of the magnetoresistive element 2 in accordance with the rotation of the object to be detected, so that the magnetic field from the magnet 1 applied to the magnetoresistive element 2 is changed. Such a change in the magnetic field is detected by the magnetoresistive element 2 as a change in its resistance. The change in the resistance generated in the magnetoresistive element 2 is sent to a computer unit (not shown) through the connector terminal 6, whereby the number of revolutions per minute of the object to be detected is detected by the computer unit.

Now, the production procedure of the magnetic detection apparatus as constructed above will be explained below.

Figure 12:
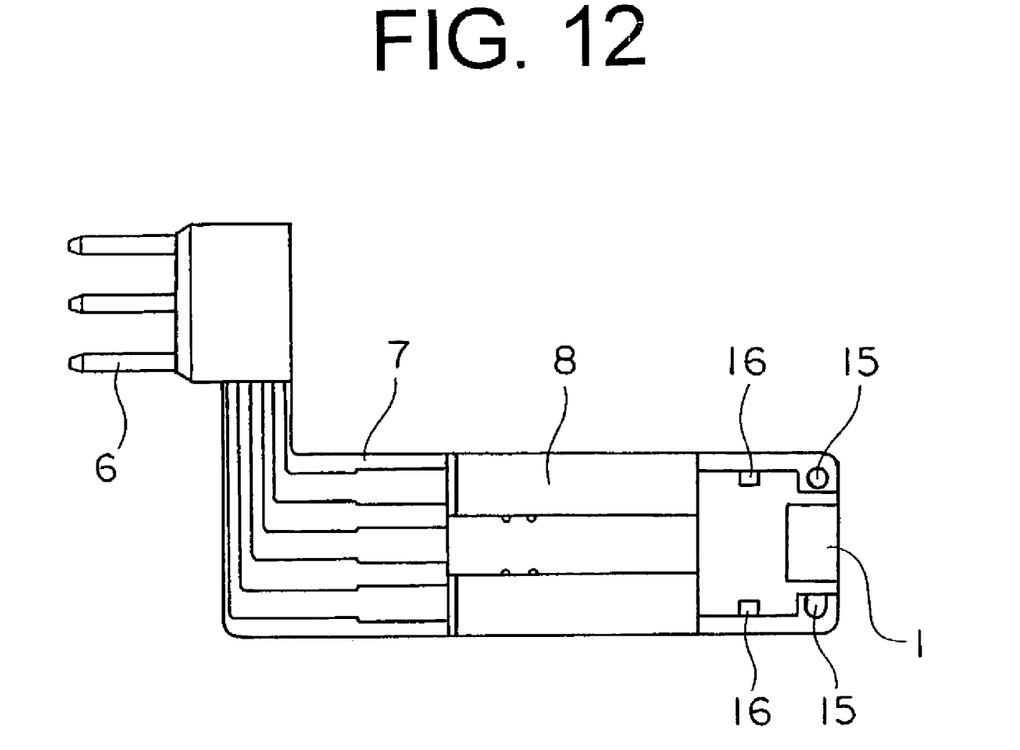
FIG. 12 is a plan view of the second block of FIG. 1 in another state in the course of production.
Figure 13:
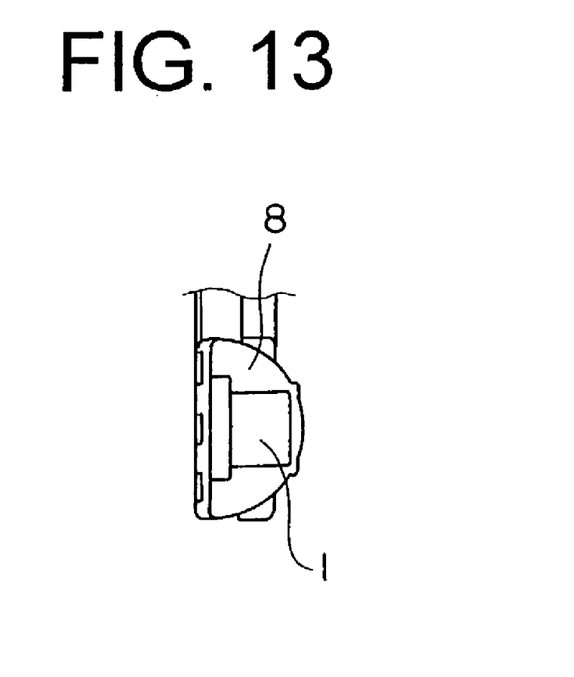
FIG. 13 is a right side view of the second block shown in FIG. 12.
Figure 14:
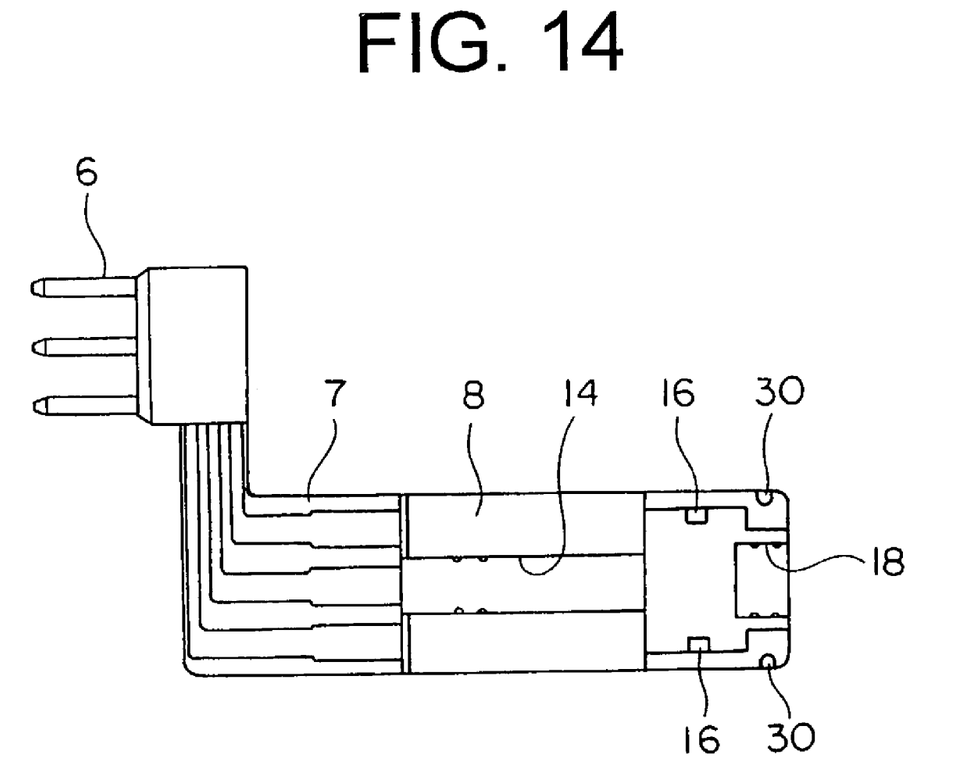
FIG. 14 is a plan view of a second block according to a second embodiment of the present invention.
Figure 15:
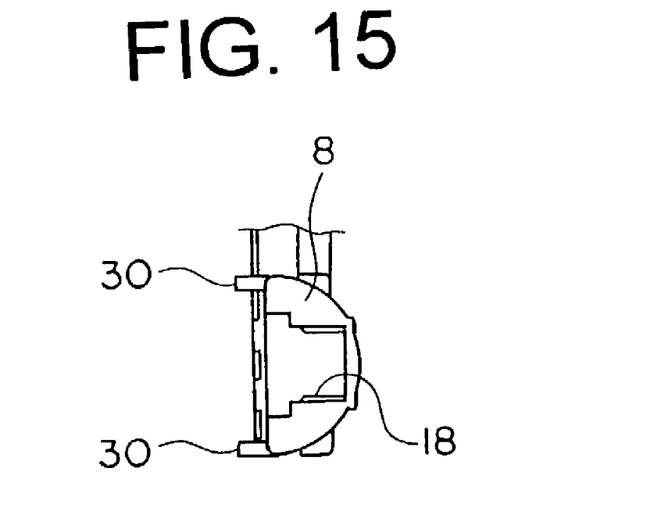
FIG. 15 is a right side view of the second block shown in FIG. 14.

First of all, as shown in FIG. 12 and FIG. 13, the magnet 1 is press-fitted into the hole 18 formed in the second base 8, which is shown in FIG. 10 and FIG. 11. Then, the protrusion 17 of the guide 13 are press-fitted into the holes 16 in the second base 8, as shown in FIG. 8 and FIG. 9.

Thereafter, the protrusions 11 of the first base 5 are placed into fitting engagement with the holes 15 in the second base 8, and at the same time the press-fit portion 10 is press-fitted into the groove 14 thereby to integrally couple the second block 12 and the first block 9 with each other.

Finally, by sealing the thus integrated first and second blocks 9, 12 with a resin by means of insert molding with the connector terminal 6 being exposed from the resin, there is produced a magnetic detection apparatus of the present invention whose external portions are covered with the exterior resin 20.

The magnetic detection apparatus of the above-mentioned construction is composed of the first block 9 which is formed by resin-sealing the electronic components 3, the first lead frame 4 and the magnetoresistive element 2 with the first base 5, the second block 12 which is formed by press-fitting the magnet 1 and the guide 13 into the second base 8, and the exterior resin 20. Accordingly, in the course of production assembly, the first block 9 and the second block 12 can be respectively handled as individual units, thereby making it possible to improve productivity.

In addition, the protrusions 11 are formed on the first base 5, and the holes 15 into which the protrusions 11 can be fittingly engaged are formed in the second base 8. With this arrangement, accuracy in the relative position between the first block 9 and the second block 12 becomes high. Moreover, accuracy in the arrangement of the magnet 1 and the magnetoresistive element 2, which has a great influence on detection accuracy, is improved, thus ensuring a high degree of detection accuracy. Further, the outer or external portions of the first block 9 and the second block 12 are covered with the exterior resin 20 by means of insert molding, during which, however, the relative position between the first block 9 and the second block 12 is prevented form being displaced or varied under the pressure of the molten resin poured or injected into a metal mold in which the first and second blocks 9, 12 are arranged.

Furthermore, the first block 9 and the second block 12 are easily integrated with each other only by press-fitting the press-fit portion 10 of the first base 5 into the groove 14 in the second base 8, and hence productivity can be improved.

Still further, merely by press-fitting the magnet 1 into the hole 18 in the second base 8 and by press-fitting the protrusions 17 of the guide 13 into the holes 16 in the second base 8, the magnet 1 and the guide 13 are easily assembled or integrated with the second base 8, thus making it possible to improve productivity.

Besides, the magnet 1 and the guide 13 are arranged between the first base 5 and the second base 8 in a clamped or sandwiched manner, so that the magnet 1 and the guide 13 are positioned and fixed at prescribed locations in a further reliable manner. As a consequence, the assemblability of the apparatus can be improved.

Embodiment 2

FIG. 14 through FIG. 17 are constructional views illustrating a magnetic detection apparatus according to a second embodiment of the present invention.

In this embodiment, a pair of protrusions 30 are formed on an anti-connector-terminal side (i.e., at a side remote from the connector terminal 6) of the second base 8, and a pair of grooves 31 into which the protrusions 30 are fitted or engaged are formed on the first base 5. These protrusions 30 and grooves 31 together constitute a positioning part that decides the relative position between the first base 5 and the second base 8. The construction of this second embodiment other than the above is similar to that of the first embodiment.

Figure 16:
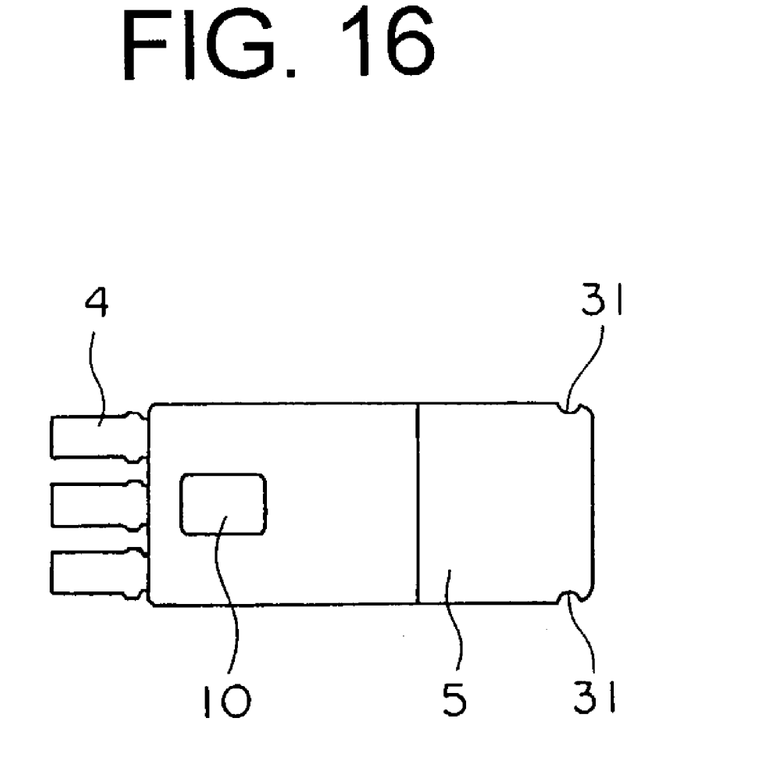
FIG. 16 is a bottom plan view of a first block according to the second embodiment of the present invention.
Figure 17:
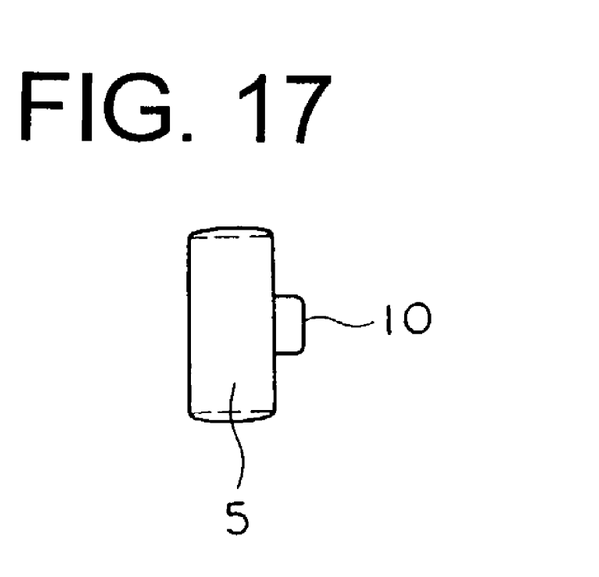
FIG. 17 is a left side view of the first block shown in FIG. 16.

In this second embodiment, the configuration of the first base 5 having the magnetoresistive element 2 built therein is further simplified, and the degree of freedom of the configuration of the first base 5 is increased, thus making it possible to achieve or construct magnetic detection apparatuses of various configurations.

Although in the above-mentioned first and second embodiments, the magnetoresistive element 2 is used as the magnetic detection part, the present invention is of course not limited to this. A hall element for converting a change in magnetic field into a change in voltage may be used instead of the magnetoresistive element 2.

In addition, an electromagnet may be used as the magnetic field generation part instead of the magnet 1.

Moreover, in order to press-fit the first base 5 into the second base 8 to provide an integral unit, the press-fit portion 10 is formed on the first base 5, and the groove 14 is formed in the second base 8, but they may be constructed such that the groove is formed in the first base and the press-fit portion is formed on the second base.

Further, although in the above-mentioned first and second embodiments, the electronic components forming a protection circuit against external noise have been described, such electronic components may be those which form a circuit necessary for connection with a computer. Additionally, note that a single electronic component may be used as the electronic components.

As can be seen from the foregoing description, the present invention provides the following excellent advantages.

According to the present invention, there is provided a magnetic detection apparatus comprising: a first block including a magnetic detection part for detecting a change in a magnetic field that varies in accordance with movement of an object to be detected, an electronic component for controlling a signal from the magnetic detection part, a first lead frame electrically connected with the electronic component, a first base in which the electronic component, the first lead frame and the magnetic detection part are sealed with a resin; a second block including a magnetic field generation part arranged in opposition to the object to be detected for generating a magnetic field, a second lead frame electrically connected with the first lead frame and having a connector terminal for outputting an output signal of the magnetic detection part to an external member, and a second base in which the second lead frame is sealed with a resin; and an exterior resin covering the first block and the second block. With this arrangement, in the course of production and assembly, the first block, which is formed by resin-sealing the electronic component, the first lead frame and the magnetic detection part with the first base, can be handled as a single unit, and the second block, which is formed by resin-sealing the magnet with the second base, can also be handled as a single unit. As a result, handling of the parts and component members becomes easy, and hence productivity can be improved.

While the invention has been described in terms of preferred embodiments, those skilled in the art will recognize that the invention can be practiced with modifications within the spirit and scope of the appended claims.

What is claimed is:

1. A magnetic detection apparatus comprising:
   a first block including a magnetic detection part for detecting a change in a magnetic field that varies in accordance with movement of an object to be detected, an electronic component for controlling a signal from said magnetic detection part, a first lead frame electrically connected with said electronic component, and a first base in which said magnetic detection part, said electronic component and at least a portion of said first lead frame are sealed with a first resin;
   a second block including a magnetic field generation part arranged in opposition to said object to be detected for generating a magnetic field, a second lead frame electrically connected with said first lead frame and having a connector terminal for outputting an output signal of said magnetic detection part to an external member, and a second base in which at least a portion of said second lead frame is sealed with a second resin; and
   a third resin covering said first block and said second block, with said connector terminal remaining exposed,
   wherein said first base is press-fitted into said second base to form an integral unit.

2. The magnetic detection apparatus as set forth in claim 1, further comprising a positioning part arranged between said first base and said second base for deciding a relative position therebetween.

3. The magnetic detection apparatus as set forth in claim 2, wherein said positioning part comprises:
   a protrusion formed on either one of said first base and said second base; and
   a hole formed in the other one of said first base and said second base for engagement with said protrusion.

4. The magnetic detection apparatus as set forth in claim 1, wherein said external member is a computer unit.

5. The magnetic detection apparatus as set forth in claim 4, wherein said computer unit detects the number of revolutions per minute of said object to be detected.

6. The magnetic detection apparatus as set forth in claim 1, wherein said magnetic detection part includes a magnetoresistive element.

7. The magnetic detection apparatus as set forth in claim 1, wherein said magnetic detection part includes a Hall element.

8. The magnetic detection apparatus as set forth in claim 1, wherein the electronic component includes a circuit for protecting against external noise.

9. A magnetic detection apparatus comprising:
   a first block including a magnetic detection part for detecting a change in a magnetic field that varies in accordance with movement of an object to be detected, an electronic component for controlling a signal from said magnetic detection part, a first lead frame electrically connected with said electronic component, and a first base in which said magnetic detection part, said electronic component and at least a portion of said first lead frame are sealed with a first resin;
   a second block including a magnetic field generation part arranged in opposition to said object to be detected for generating a magnetic field, a second lead frame electrically connected with said first lead frame and having a connector terminal for outputting an output signal of said magnetic detection part to an external member, and a second base in which at least a portion of said second lead frame is sealed with a second resin;
   a third resin covering said first block and said second block, with said connector terminal remaining exposed; and
   a guide press-fitted into said second base to be integrated therewith for guiding the magnetic field generated by said magnetic field generation part into said magnetic detection part.

10. The magnetic detection apparatus as set forth in claim 9, wherein said magnetic field generation part and said guide are arranged between said first base and said second base.

11. The magnetic detection apparatus as set forth in claim 9, wherein the electronic component includes a circuit for protecting against external noise.

12. The magnetic detection apparatus as set forth in claim 9, wherein said external member is a computer unit.

13. The magnetic detection apparatus as set forth in claim 12, wherein said computer unit detects the number of revolutions per minute of said object to be detected.

14. The magnetic detection apparatus as set forth in claim 9, wherein said magnetic detection part includes a magnetoresistive element.

15. The magnetic detection apparatus as set forth in claim 9, wherein said magnetic detection part includes a Hall element.

* * * * *